Patented June 16, 1931

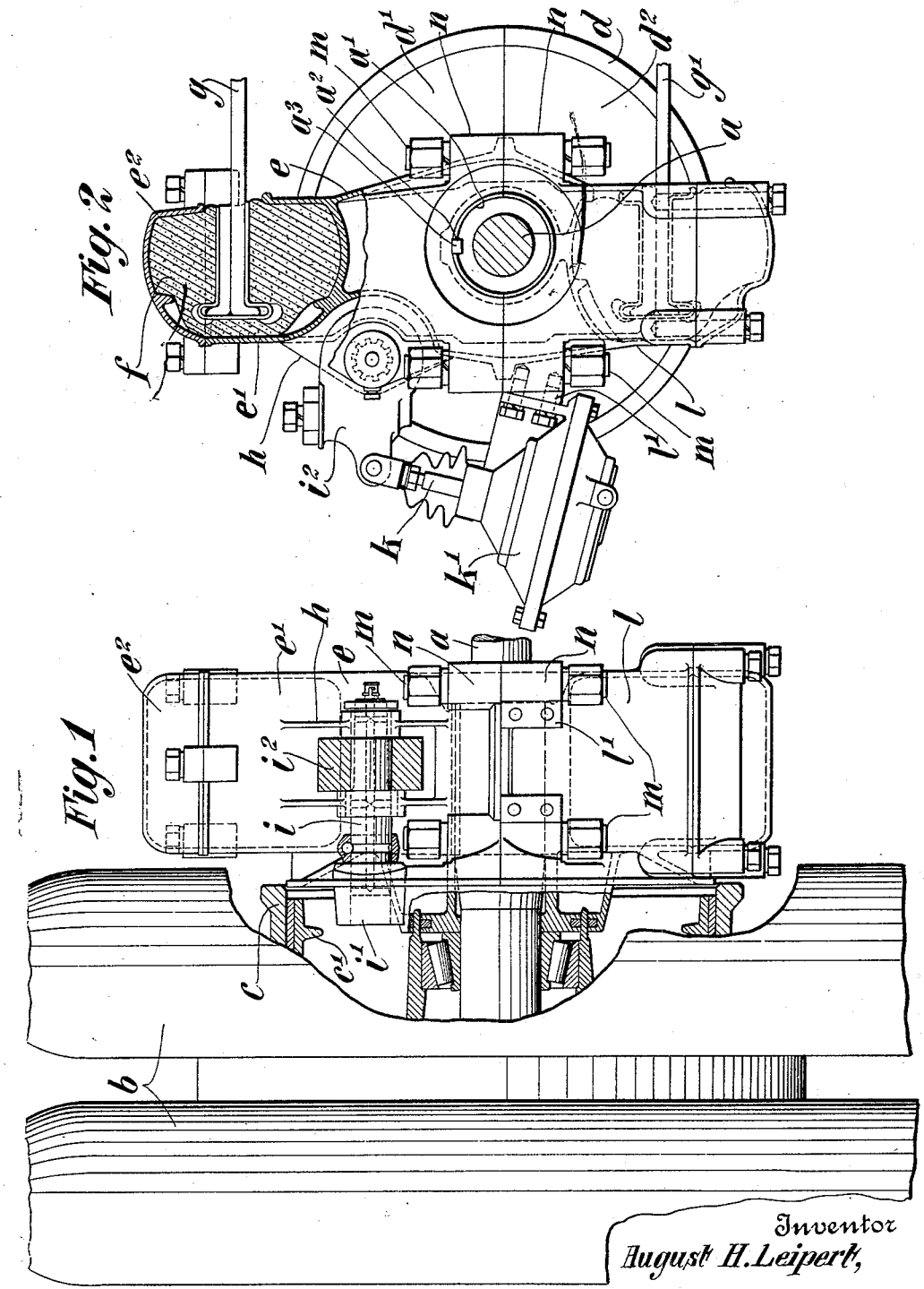

1,810,356

UNITED STATES PATENT OFFICE

AUGUST H. LEIPERT, OF COLLEGE POINT, LONG ISLAND, NEW YORK, ASSIGNOR TO INTERNATIONAL MOTOR COMPANY, OF NEW YORK, N. Y., A CORPORATION OF DELAWARE

BRAKE SPIDER

Application filed June 1, 1928. Serial No. 282,261.

The present invention relates to an improved and simplified construction for a brake spider which is designed to reduce the number of parts, simplify the assembly thereof, and materially increase the strength of the construction.

The great number of parts and elements requiring adjustment carried by the rear wheels of a vehicle has long presented a difficult problem in the assembly and maintenance of this portion of the vehicle. Existing designs have included built-up structures which are quite cumbersome to assemble and difficult to take down for repairs. As an improvement on these constructions, an object of this invention is to provide a brake spider which is keyed to the axle housing and carries the spring mountings, as well as the brake and brake actuating mechanism.

Further objects will appear as the invention is described more fully in connection with the accompanying drawings, wherein:

Figure 1 is a view in elevation, partly broken away and in section, showing a preferred form of the invention.

Figure 2 is a view in side elevation, partly broken away and in section, showing the brake spider construction of Figure 1.

Referring to the above drawings, $a$ designates the live axle or jack shaft which drives the rear wheels $b$ provided with a brake drum $c$. Within the brake drum, expanding brake shoes $c'$ are provided, these brake shoes being mounted upon brake spiders $d$ as described hereinafter.

The axle housing $a'$ is formed with a keyway $a^2$ within which a key $a^3$ lies. This key engages a key-way in the upper portion $d'$ of the brake spider $d$ and, in this manner, the brake spider and housing are secured positively together. The upper portion $d'$ of the brake spider $d$ has formed integrally therewith a bracket $e$ which is provided with a housing $e'$ for receiving a block of yielding non-metallic material $f$. A housing cap $e^2$ serves to close the housing and secure the block $f$ under a suitable degree of pressure. Spring $g$ is secured, at its end, in the block $f$ and, in this manner, the spring is mounted directly on the brake spider which is carried by the axle housing.

The bracket $e$ is provided with a secondary bracket $h$ which mounts the brake operating shaft $i$ rotatably. Shaft $i$ is provided with a brake operating cam $i'$ and serves to apply the brakes in a well known manner. The shaft $i$ is rotated by a suitable crank arm $i^2$ which may be operated by the connecting rod $k$ of an automatic brake operating mechanism $k'$.

The lower portion $d^2$ of the brake spider $d$ is provided with a downwardly extending bracket $l$ which is similar to the bracket $e$. This bracket carries a second block of yielding non-metallic material within its housing and secures the end of the lower spring $g'$. The automatic brake operating mechanism is secured directly to a suitably formed boss $l'$ on the bracket $l$ and bolts $m$, passing through spaced flanges $n$ of the respective brackets $e$ and $l$, serves to connect the upper and lower portions of the brake spider $d$ and $d^2$ together.

It will be seen that the upper and lower portions of the brake spider may be formed of castings and provided with various elements so that the resulting structure is greatly simplified and strengthened. In assembling the construction, the bolts $m$ are the sole securing elements and, in this manner, the structure is mounted with great facility.

It will be apparent that changes in the design and arrangement of the component parts may be made without departing from the scope of the invention as defined in the appended claims.

I claim as my invention:

1. In combination with vehicle springs and an axle housing, a brake spider comprising independent sections, means to secure the sections as a unit upon the axle housing, and means to secure one of the springs to each of the sections.

2. In combination with vehicle springs and an axle housing, a brake spider comprising independent sections, cooperating flanges upon the sections, means to secure the flanges to the axle housing, brackets on the sections, and means to secure the springs to the brackets.

3. In combination with vehicle springs and an axle housing, a brake spider comprising independent sections, cooperating flanges upon the sections, means to secure the flanges to the axle housing, brackets on the sections, housings carried by the brackets, yielding non-metallic material carried in the housings, and means to secure the springs to the brackets.

4. In combination with vehicle springs and an axle housing, a brake spider comprising independent sections, cooperating flanges upon the sections, means to secure the flanges to the axle housing, brackets on the sections, means to secure brake actuating mechanism to one of the brackets, and means to secure the springs to the brackets.

This specification signed this 23rd day of May, A. D. 1928.

AUGUST H. LEIPERT.